United States Patent
Okita

(10) Patent No.: US 10,481,583 B2
(45) Date of Patent: Nov. 19, 2019

(54) NUMERICAL CONTROL APPARATUS

(71) Applicant: FANUC CORPORATION, Yamanashi (JP)

(72) Inventor: Hiroshi Okita, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 161 days.

(21) Appl. No.: 15/841,849

(22) Filed: Dec. 14, 2017

(65) Prior Publication Data

US 2018/0173198 A1 Jun. 21, 2018

(30) Foreign Application Priority Data

Dec. 15, 2016 (JP) ................................. 2016-242883

(51) Int. Cl.
G05B 19/4068 (2006.01)
G05B 19/414 (2006.01)
G05B 19/4063 (2006.01)

(52) U.S. Cl.
CPC ..... *G05B 19/4068* (2013.01); *G05B 19/4063* (2013.01); *G05B 19/4148* (2013.01)

(58) Field of Classification Search
CPC ............ G05B 19/4068; G05B 19/4063; G05B 19/4148
See application file for complete search history.

(56) References Cited

U.S. PATENT DOCUMENTS 5,717,433 A * 2/1998 Doba .................. G06F 3/04886
345/173

7,069,185 B1 * 6/2006 Wilson ................. G05B 19/058
700/26
2008/0294805 A1 11/2008 Sone et al.

FOREIGN PATENT DOCUMENTS

| JP | 62281010 A | 12/1987 |
| JP | 641007 A | 1/1989 |
| JP | 2113304 A | 4/1990 |
| JP | 5200658 A | 8/1993 |
| JP | 6348320 A | 12/1994 |
| JP | 8223665 A | 8/1996 |
| JP | 2008293374 A | 12/2008 |

(Continued)

OTHER PUBLICATIONS

English Abstract for Japanese Publication No. 2008-293374 A, published Dec. 4, 2008, 1 pg.

(Continued)

*Primary Examiner* — Charles R Kasenge
(74) *Attorney, Agent, or Firm* — Fredrikson & Byron, P.A.

(57) ABSTRACT

A numerical control apparatus for controlling a machine tool, includes: a first control unit for controlling the machine tool for machining; an image display device for displaying at least the status of the machine tool and the first control unit; a second control unit for controlling the image display device; a first light-emitting portion; and a second light-emitting portion, is constructed such that when an anomaly occurs in the second control unit, making the second control unit unable to display the status of the machine tool and the first control unit on the image display device, the first light-emitting portion notifies the status of the machine tool by emission of light and the second light-emitting portion notifies by emission of light that an anomaly has occurred in the second control unit.

11 Claims, 2 Drawing Sheets

(56) References Cited

FOREIGN PATENT DOCUMENTS

| JP | 2009205277 A | 9/2009 |
|---|---|---|
| WO | 2014184897 A1 | 11/2014 |

OTHER PUBLICATIONS

English Abstract and Machine Translation for Japanese Publication No. 08-223665 A, published Aug. 30, 1996, 7 pgs.
English Abstract and Machine Translation for Japanese Publication No. 02-113304 A, published Apr. 25, 1990, 5 pgs.
English Abstract and Machine Translation for Japanese Publication No. 62-281010 A, published Dec. 5, 1987, 5 pgs.
English Abstract and Machine Translation for Japanese Publication No. 06-348320 A, published Dec. 22, 1994, 8 pgs.
English Abstract and Machine Translation for Japanese Publication No. 2009-205277 A, published Sep. 10, 2009, 10 pgs.
English Abstract and Machine Translation for International Publication No. WO 2014/184897 A1, published Nov. 20, 2014, 12 pgs.
English Abstract and Machine Translation for Japanese Publication No. 64-001007 A, published Jan. 5, 1989, 5 pgs.
English Abstract and Machine Translation for Japanese Publication No. 05-200658 A, published Aug. 10, 1993, 9 pgs.
Untranslated Decision to Grant a Patent mailed by Japan Patent Office (JPO) for Application No. 2016-242883, dated Apr. 9, 2019, 3 pgs.
English Machine Translation of Decision to Grant a Patent mailed by Japan Patent Office (JPO) for Application No. 2016-242883, dated Apr. 9, 2019, 2 pgs.
Untranslated Notification of Reasons for Refusal mailed by Japan Patent Office (JPO) for Application No. 2016-242883, dated Nov. 13, 2018, 4 pgs.
English Machine Translation of Notification of Reasons for Refusal mailed by Japan Patent Office (JPO) for Application No. 2016-242883, dated Nov. 13, 2018, 4 pgs.

\* cited by examiner

NUMERICAL CONTROL APPARATUS

CROSS-REFERENCE TO RELATED APPLICATION

This application is based upon and claims the benefit of priority from Japanese Patent Application No. 2016-242883 filed on Dec. 15, 2016, the contents of which are incorporated herein by reference.

BACKGROUND OF THE INVENTION

Field of the Invention

The present invention relates to a numerical control apparatus for controlling a machine tool.

Description of the Related Art

The numerical control apparatus disclosed in Japanese Laid-Open Patent Publication No. 08-223665 includes a CPU serving as a control center of the whole numerical control apparatus to control axial movement and others, and a display control circuit for controlling a display device that displays the positions of individual axes, alarms and parameters, etc.

SUMMARY OF THE INVENTION

However, in the above Japanese Laid-Open Patent Publication No. 08-223665, when an anomaly takes place in the display control circuit (which will be hereinbelow referred to as a display control unit) to fall into a state where the display device cannot display predetermined information, there occurs a risk that the operator cannot determine whether the machine tool is operating correctly and may stop the operation of the machine tool. If the machine tool is stopped due to an anomaly of the display control unit despite the fact that the machine tool is operating correctly, the working efficiency is lowered.

It is therefore an object of the present invention to provide a numerical control apparatus that prevents a machine tool from being unnecessarily stopped even when an anomaly occurs in a display control unit.

The aspect of the present invention resides in a numerical control apparatus for controlling a machine tool including: a first control unit configured to control the machine tool for machining; an image display device configured to display at least the status of the machine tool and the first control unit; a second control unit configured to control the image display device; a first light-emitting portion; and a second light-emitting portion, and constructed such that when an anomaly occurs in the second control unit, making the second control unit unable to display the status of the machine tool and the first control unit on the image display device, the first light-emitting portion notifies the state of the machine tool or the first control unit by emission of light and the second light-emitting portion notifies by emission of light that an anomaly has occurred in the second control unit.

According to the present invention, the operator still can determine whether or not to stop the operation of the machine tool, in conformity with the status of the machine tool when an anomaly occurs in the second control unit. It is therefore possible to prevent the operation of the machine tool from being wastefully stopped during machining, hence avoid the machining up to then from being wasted.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A numerical control apparatus according to the present invention will be detailed hereinbelow by describing a preferred embodiment with reference to the accompanying drawings.

Figure 1:
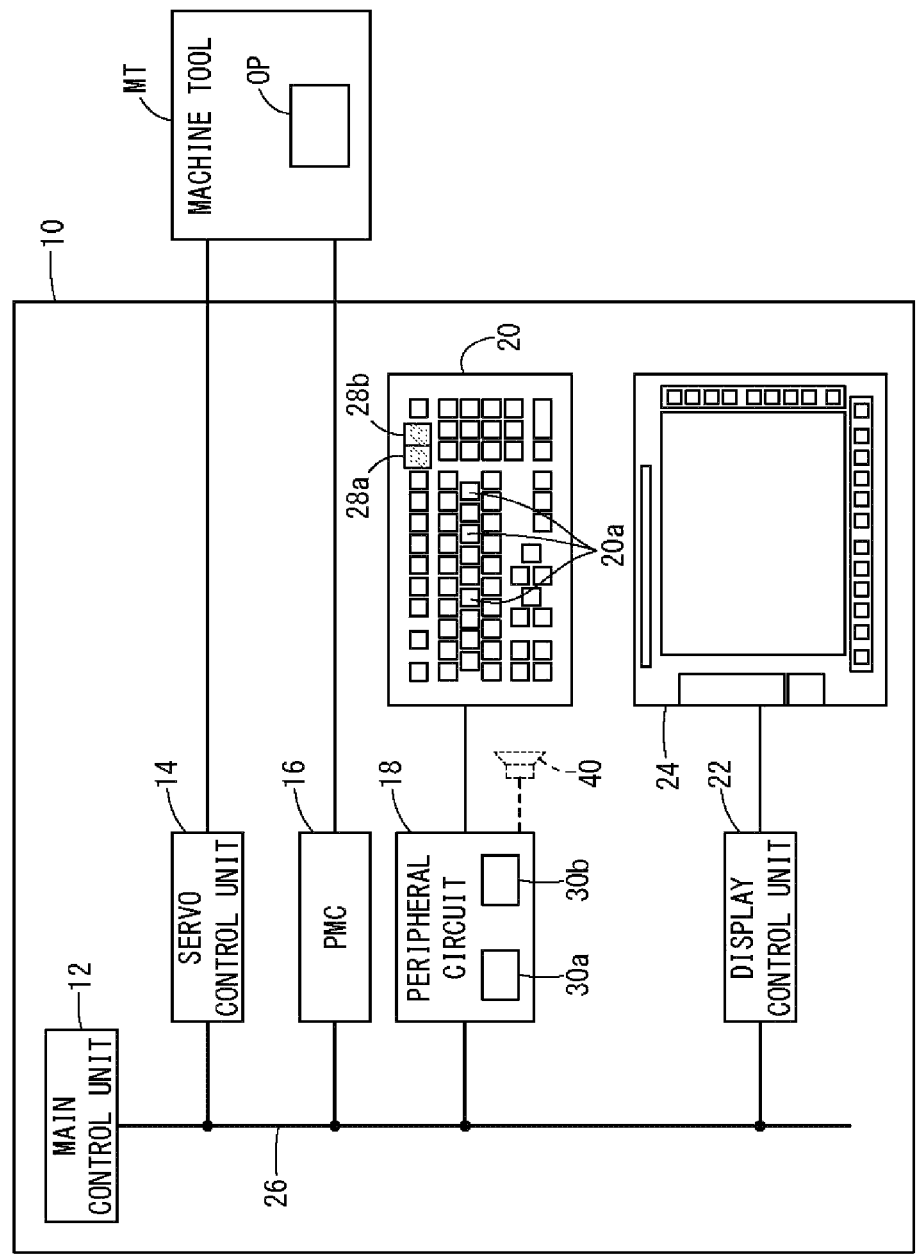
FIG. 1 is a configuration diagram of a numerical control apparatus.

FIG. 1 is a configuration diagram of a numerical control apparatus 10. The numerical control apparatus 10 for numerically controlling a machine tool MT includes a main control unit (first control unit) 12, a servo control unit 14, a PMC (programmable machine controller) 16, a peripheral circuit 18, an input device 20, a display control unit (second control unit) 22 and an image display device 24. The main control unit 12, the servo control unit 14, the PMC 16, the peripheral circuit 18 and the display control unit 22 are connected to each other via a bus 26.

The main control unit 12 controls the entire numerical control apparatus 10. The main control unit 12 controls movement of each axis of the machine tool MT and others based on a machining program or the like. The main control unit 12 can also control the machining of the machine tool MT by controlling the movement of every axis of the machine tool MT. The main control unit 12 includes a processor such as a CPU, a memory and the like, providing the function of the main control unit 12 of the present embodiment by running system software (not shown).

Under the control of the main control unit 12, the servo control unit 14 controls movement of each axis of the machine tool MT via an unillustrated servo amplifier. The PMC 16 is connected to sensors, drive circuits for driving valves and the like which are provided in the machine tool MT via an unillustrated I/O device.

The peripheral circuit 18 connects the bus 26 and the peripheral devices provided in the numerical control apparatus 10. An input device 20 is connected via a peripheral circuit 18, and a USB memory (not shown) and a communication unit (not shown) are connected. The communication unit communicates with other devices and external devices by Ethernet (registered trademark) or the like. The input device 20 is provided with a plurality of key tops 20*a* operated by an operator to input information and the like.

The display control unit 22 controls the image display device 24 to display predetermined information on the display screen (screen) of the image display device 24. The display control unit 22 includes a processor such as a CPU or the like, a memory and the like, providing the function of the display control unit 22 of the present embodiment by running system software. The image display device 24 is a display device, constituted of a liquid crystal display, an organic EL display or the like, and capable of displaying predetermined information on the screen (in image).

In the present embodiment, the numerical control apparatus 10 includes a first light-emitting portion 28a and a second light-emitting portion 28b that emit light. The first light-emitting portion 28a and the second light-emitting portion 28b are provided on the input device 20, and the first light-emitting portion 28a and the second light-emitting portion 28b are connected to the bus 26 via the peripheral circuit 18. Specifically, the first light-emitting portion 28a is connected to the peripheral circuit 18 via a driving circuit (not shown) that turns on the first light-emitting portion 28a, and the second light-emitting portion 28b is connected to the peripheral circuit 18 via a driving circuit (not shown) that turns on the second light-emitting portion 28b. These drive circuits may be provided in the input device 20. At least one of the first light-emitting portion 28a and the second light-emitting portion 28b is provided not on the input device 20 but on an operation panel OP provided on the machine tool MT in order to operate the movement of the axes in the machine tool MT.

In the present embodiment, the first light-emitting portion 28a and the second light-emitting portion 28b are each configured with a 7-segment display. The first light-emitting portion 28a emits light (illuminates) to indicate the state of the NC side (at least one of the status of the machine tool MT and the main control unit 12), and the second light-emitting portion 28b emits light (illuminates) to display the state of the display side (the status of the display control unit 22). The first and second light-emitting portions 28a and 28b of 7-segment displays may be formed either integrally or separately.

The numerical control apparatus 10 may include a first register 30a for holding (storing) a command signal for lighting the first light-emitting portion 28a to indicate the state on the NC side and a second register 30b for holding (storing) a command signal for lighting the second light-emitting portion 28b to indicate the state on the display side. The first register 30a and the second register 30b may be provided in the peripheral circuit 18. The first light-emitting portion 28a and the second light-emitting portion 28b may emit light in accordance with command signals stored in the first register 30a and the second register 30b, respectively.

Next, the operation of the numerical control apparatus 10 (in particular, the lighting operation of the light-emitting portion 28) will be described separately at startup, after completion of startup, and when an anomaly occurs in the display control unit 22 after completion of startup.

<Operation at Startup of Numerical Control Apparatus 10>

When the numerical control apparatus 10 is powered on, the main control unit 12 and the display control unit 22 each perform a series of preparatory operations (boot process). The series of preparatory operations may include, for example, initialization of memory, loading of system software, initial setting, and the like. These preparatory operations are performed in a predetermined order. The main control unit 12 and the display control unit 22 control the light emission of the first light-emitting portion 28a and the second light-emitting portion 28b so that the first light-emitting portion 28a and the second light-emitting portion 28b notify the operating status of the main control unit 12 and the display control unit 22 at startup. That is, the main control unit 12 and the display control unit 22 control the first light-emitting portion 28a and the second light-emitting portion 28b so as to be illuminated in accordance with the operating status of the main control unit 12 and the display control unit 22 at the time of startup. The first light-emitting portion 28a notifies the operating status of the main control unit 12 and the second light-emitting portion 28b notifies the operating status of the display control unit 22.

The main control unit 12 and the display control unit 22 control the first light-emitting portion 28a and the second light-emitting portion 28b so as to illuminate in accordance with the latest preparatory operations that have been completed, whereby it is possible for the operator to know to which stage each series of preparatory operations has been completed correctly. For example, a series of preparatory operations performed in a predetermined order may be visualized on a countdown basis (on a basis in which the displayed number is decremented by 1 every time one step of preparatory operations is completed). In this case, the number displayed when the whole series of preparatory operations is completed may be set to 0. When the displayed number stops halfway, the operator can recognize at which preparatory operation an anomaly has occurred.

The main control unit 12 and the display control unit 22 may be each configured to store a command signal into the associated first or second register 30a, 30b so that the first or second light-emitting portion 28a, 28b can emit light in accordance with the finished preparatory operation every time one preparatory operation is completed. The driving circuits for turning on the first light-emitting portion 28a and the second light-emitting portion 28b may turn on the first light-emitting portion 28a and the second light-emitting portion 28b, based on the command signals stored in the first register 30a and the second register 30b, respectively.

<Operation after Completion of Startup of Numerical Control Apparatus 10>

When the main control unit 12 and the display control unit 22 have performed a series of preparatory operations so that the main control unit 12 and the display control unit 22 become ready to operate, the display control unit 22 controls the image display device 24 so as to display the status of the machine tool MT and the main control unit 12. The display control unit 22 acquires detection signals and/or status signals (including alarm signals and the like) from the main control unit 12, the servo control unit 14, the PMC 16 and the peripheral circuit 18 to display the status of the machine tool MT and the main control unit 12, based on the acquired, detection signals and status signals.

For example, the display control unit 22 may acquire, from the servo control unit 14, and display status signals indicating positions of the axes, or moving speeds of the axes of the machine tool MT controlled by the servo control unit 14. The display control unit 22 may obtain and display the detection signals detected by the sensors connected to the PMC 16 via the I/O device or may obtain and display the status signals indicating the open/closed states of the valves from the driving circuit for driving the valves connected to the PMC 16 via the I/O device.

Further, the display control unit 22 may acquire, from the peripheral circuit 18, and display status signals indicating the remaining storage capacity and the total storage capacity of the USB memory or the status signal indicating the communication state of the communication unit. The display control unit 22 may acquire, from the main control unit 12, and display a status signal indicating whether the main control unit 12 is operating correctly. Further, the display control unit 22 may acquire, from the main control unit 12, and display a status signal indicating the current machining status of the machine tool MT (automatic operation in progress, setup in progress, pausing, emergency stop, etc.).

As described above, when the display control unit 22 operates correctly after the numerical control apparatus 10 is fully activated, the display control unit 22 can display the status of the machine tool MT and the main control unit 12 on the image display device 24, so that the first light-emitting portion 28a does not need to emit light to notify the operator of the states on the NC side and the like. That is, it is not necessary for the first register 30a to store the command signal for turning on the first light-emitting portion 28a. Therefore, when a command signal for emitting light from the first light-emitting portion 28a has been stored in the first register 30a, the main control unit 12 or the display control unit 22 may access the first register 30a to delete the stored command signal therefrom.

Even when the numerical control apparatus 10 has been fully activated and the display control unit 22 operates correctly, if it is desired to emit light from the first light-emitting portion 28a and notify the state of the NC side, the main control unit 12 or the display control unit 22 may store in the first register 30a a command signal for causing the first light-emitting portion 28a to emit light in accordance with the state of the NC side. Since the first light-emitting portion 28a of a 7-segment display is used to notify the status of the machine tool MT, the amount of information that can be notified is limited.

After activation of the numerical control apparatus 10, the display control unit 22 may control the light emission of the second light-emitting portion 28b to notify the operator that there is no anomaly in the display control unit 22. In this case, the display control unit 22 controls the light emission of the second light-emitting portion 28b so as to be illuminated in accordance with the non-anomaly state. When, for example, the non-anomaly state is assumed to be demonstrated by flashing of a predetermined figure (for example, "0") on the second light-emitting portion 28b, the display control unit 22 periodically accesses the second register 30b to write a command signal for showing "0" and delete the command signal (or write a command signal for turning off), alternately.

When flashing display is performed in the above way, the display control unit 22 controls the light emission of the second light-emitting portion 28b so as to periodically change the light emitting state of the second light-emitting portion 28b (periodically accesses the second register 30b to change the stored content of the second register 30b), so that the display control unit 22 can easily demonstrate that the device itself is operating normally. Further, when an anomaly occurs in the display control unit 22, the content stored in the second register 30b is not changed, so that the second light-emitting portion 28b stays in a lit state of "0" or is turned off, whereby it is possible to notify occurrence of an anomaly in the display control unit 22.

Though the display control unit 22 is configured to cause the second light-emitting portion 28b to blink when there is no anomaly, it is possible to configure the display control unit 22 so as to periodically switch the figure displayed on the second light-emitting portion 28b. Also in this case, the display control unit 22 periodically accesses the second register 30b to change the content of the command signal held in the second register 30b, so that the display control unit 22 can easily notify that the device itself is operating normally. Here, when there is no anomaly, flashing display or switching display of letters of alphabet or symbols may be used, not limited to the figures.

<Operation when Anomaly Occurs in the Display Control Unit 22 after Activation of the Numerical Control Apparatus 10>

When the main control unit 12 and the display control unit 22 have completed a series of preparatory operations so as to be able to perform full operation, the main control unit 12 determines whether or not an anomaly is occurring in the display control unit 22. The main control unit 12 may determine whether or not an anomaly has occurred in the display control unit 22 by periodically communicating with the display control unit 22, or may determine whether or not an anomaly has occurred in the display control unit 22 by periodically checking the stored content of the second register 30b.

When an anomaly occurs in the display control unit 22, information such as the status of the machine tool MT will not be displayed on the image display device 24. To deal with this situation, when determining that an anomaly has occurred in the display control unit 22, the main control unit 12 controls the light emission of the first light-emitting portion 28a so as to notify the operator of the status of the machine tool MT. The main control unit 12 may cause the first light-emitting portion 28a to emit light in accordance with the status of the machine tool MT by storing a command signal corresponding to the status of the machine tool MT into the first register 30a.

When the display control unit 22 fails to function correctly, the first light-emitting portion 28a may notify, for example, automatic operation in progress, setup in progress, pausing, emergency stop or the like as the status of the machine tool MT, by emission of light. Alternatively, the first light-emitting portion 28a may notify, as the status of the machine tool MT, whether or not the drive system (e.g., the servo control unit 14, the servo amplifier and the servo motor) for moving the axes is functioning correctly, whether or not the devices (sensors, valves, etc.) connected to the PMC 16 via the I/O device is functioning correctly, and/or whether or not the communication state of the communication unit is correctly operating. Since the first light-emitting portion 28a constituted of a 7-segment display is used to notify the status of the machine tool MT, the amount of information that can be notified is limited so that the main control unit 12 displays the predetermined states of the machine tool MT as much as the first light-emitting portion 28a can indicate.

Further, when determining that an anomaly has occurred in the display control unit 22, the main control unit 12 may control the light emission of the second light-emitting portion 28b so as to inform that an anomaly has occurred in the display control unit 22. That is, when determining that an anomaly has occurred in the display control unit 22, the main control unit 12 may store a command signal corresponding to the state of an anomaly of the display control unit 22 in the second register 30b, and cause the second light-emitting portion 28b to emit light corresponding to the anomaly of the display control unit 22.

As described above, in the case where the display control unit 22 is configured to cause the second light-emitting portion 28b to blink when there is no anomaly, the second light-emitting portion 28b stops blinking if the display control unit 22 becomes anomaly. Accordingly, the operator can recognize that an anomaly has occurred in the display control unit 22 even if the main control unit 12 does not control the light emission of the second light-emitting portion 28b. On the other hand, in a case where the display control unit 22 is configured to control and cause the second light-emitting portion 28b to simply turn on (continuously light), instead of blinking, in the normal state, the lit display continues as long as the command signal is stored in the second register 30b. In this case, the main control unit 12 may be configured to store a command signal corresponding to the anomaly of the display control unit 22 into the second register 30b when determining that an anomaly has occurred in the display control unit 22, whereby it is possible to deal with this situation.

When the display control unit 22 is normal and an anomaly occurs in the image display device 24, no information is displayed on the screen of the image display device 24. However, by watching the light emission state of the second light-emitting portion 28b, the operator is able to know which of the display control unit 22 or the image display device 24 is responsible for the information display failure. For example, when no information is displayed on the screen of the image display device 24 but "0" is blink-displayed in the second light-emitting portion 28b, the operator can determine that the display control unit 22 is operating correctly and an anomaly has occurred in the image display device 24.

MODIFIED EXAMPLES

The above embodiment may be modified as follows.

Modified Example 1

In the above embodiment, the first and second light-emitting portions 28a and 28b are each configured of a 7-segment display, but each of the first and second light-emitting portions 28a and 28b may be formed of LEDs (light emitting devices), or may be composed of LEDs and a 7-segment display. The LEDs forming the first light-emitting portion 28a may be configured to emit light based on the command signal stored in the first register 30a and the LEDs constituting the second light-emitting portion 28b may be configured to emit light based on the command signal stored in the second register 30b.

Figure 2:
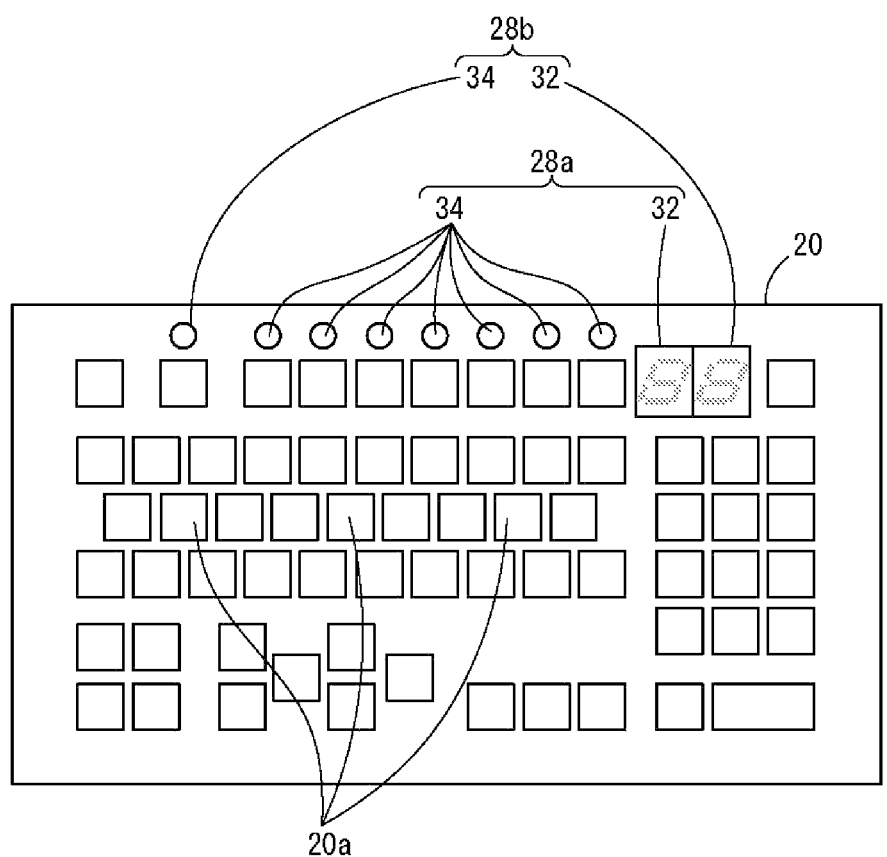
FIG. 2 is a diagram showing an example in a case where first and second light-emitting portions shown in FIG. 1 are configured of 7-segment displays and LEDs.

FIG. 2 is a diagram showing an example in which the first and second light-emitting portions 28a and 28b are composed of 7-segment displays 32 and LEDs 34. The configuration shown in FIG. 2 is the same as that of the input device 20 shown in FIG. 1 except that multiple LEDs 34 are provided. As described above, by further adding LEDs 34 to the first and second light-emitting portions 28a and 28b, an increased amount of information can be notified. Though FIG. 2 shows an example in which multiple LEDs 34 are arranged in the input device 20, they may be provided in the operation panel OP or the like of the machine tool MT.

The example shown in FIG. 2 illustrates a configuration in which one 7-segment display 32 and seven LEDs 34 constitute the first light-emitting portion 28a while one 7-segment display 32 and one LED 34 constitute the second light-emitting portion 28b. The second light-emitting portion 28b may also have multiple LEDs 34.

The one LED 34 forming the second light-emitting portion 28b is made to function as an LED (which will be referred to, hereinbelow, as display control alert LED) 34 for notifying the operator that the display control unit 22 is functioning correctly while the display control unit 22 is configured to control light emission of the display control alert LED 34, to thereby notify the operator that the main control unit 12 is normal. When determining that an anomaly has occurred in the display control unit 22, the main control unit 12 may control the display control alert LED 34 so as to emit light or flash in a color different from that in the normal state.

One of the LEDs 34 constituting the first light-emitting portion 28a is made to function as an LED (which will be referred to, hereinbelow, as display control alert LED) 34 for notifying the operator that the main control unit 12 is functioning correctly while the main control unit 12 is configured to control light emission of the main control alert LED 34, at least, when an anomaly occurs in the display control unit 22, to thereby notify the operator that the main control unit 12 is normal. Also in this case, when the main control unit 12 is configured to control light emission of the display control alert LED 34 so as to flash, it is possible to notify the operator of an anomaly state of main control unit 12 if an anomaly has occurred in the main control unit 12.

Even when each of the first light-emitting portion 28a and the second light-emitting portion 28b is configured with multiple LEDs 34 alone (without any 7-segment display 32), the status of the machine tool MT, the main control unit 12 and the display control unit 22 can be notified in a similar manner.

Modified Example 2

The LEDs 34 of the first and second light-emitting portions 28a and 28b in the above Modified Example 1 may be provided so that key tops 20a of the input device 20 light up. One or multiple LEDs 34 may be provided so that one or multiple predetermined key tops 20a among all the key tops 20a may individually illuminate, or all the key tops 20a may be provided with LEDs 34 so that they can illuminate individually. In this case, the key tops 20a to be lit are formed of a light transmitting material.

Modified Example 3

Though, in the above-described embodiment and Modified Examples 1 and 2, light is used to notify an anomaly that has occurred in the display control unit 22, the anomaly may be notified by making a sound from a speaker 40 (indicated by a broken line in FIG. 1). In this case, the speaker 40 is connected to the peripheral circuit 18, and the main control unit 12 is configured to control the speaker 40 when an anomaly occurs in the display control unit 22 so as to output a sound corresponding to the anomaly of the display control unit 22.

As described above, the numerical control apparatus 10 for controlling the machine tool MT, described in the above embodiment and Modified Examples 1 and 2, includes: a main control unit (first control unit) 12 for controlling the machine tool MT for machining; an image display device 24 for displaying at least the status of the machine tool MT and the main control unit 12; a display control unit (second control unit) 22 for controlling the image display device 24; a first light-emitting portion 28a; and a second light-emitting portion 28b. In this arrangement, when an anomaly occurs in the display control unit 22, making the display control unit 22 unable to display the status of the machine tool MT and the main control unit 12 on the image display device 24, the first light-emitting portion 28a notifies the status of the machine tool MT by emission of light and the second light-emitting portion 28b notifies by emission of light that an anomaly has occurred in the display control unit 22.

As a result, the operator can recognize the occurrence of an anomaly in the display control unit 22 and the current status of the machine tool MT and determine whether or not to stop the operation of the machine tool MT, in conformity with the status of the machine tool MT. It is therefore possible to prevent the operation of the machine tool from being wastefully stopped during machining, hence avoid the machining up to then being wasted.

The display control unit 22 may be configured to control the light emission of the second light-emitting portion 28b to notify that there is no anomaly in the display control unit 22. Thus, the operator can recognize that there is no anomaly in the display control unit 22. Further, when the display control unit 22 is configured to control the light emission of the second light-emitting portion 28b so as to periodically change the lighting state thereof (for example, by blinking display or the like), it is possible to notify the operator of the occurrence of an anomaly in the display control unit 22.

The main control unit 12 may be configured to control the light emission of the second light-emitting portion 28b upon occurrence of an anomaly in the display control unit 22 so as to notify that an anomaly has occurred in the display control unit 22. Thereby, the operator can recognize that an anomaly has occurred in the display control unit 22.

The main control unit 12 and the display control unit 22 may be configured to control the first light-emitting portion 28a and the second light-emitting portion 28b, respectively, so as to notify the operating status thereof while the numerical control apparatus 10 is being booted up. Thereby, the operator can recognize whether or not the main control unit 12 and the display control unit 22 are activated normally. In addition, even if an anomaly occurs during startup, the operator can also recognize which preparatory operation is anomaly and which of the main control unit 12 or the display control unit 22 has not started correctly.

The display control unit 22 may be configured to control the image display device 24 so as to display the status of the machine tool MT and the main control unit 12 after completion of the startup of the numerical control apparatus 10. Thereby, the operator can recognize the detailed status of the machine tool MT and the main control unit 12.

The main control unit 12 may be configured to control the light emission of the first light-emitting portion 28a upon occurrence of an anomaly in the display control unit 22 so as to notify the status of the machine tool MT. This enables the operator to recognize the status of the machine tool even when the display control unit 22 is in an abnormal state, hence judge whether or not to stop the operation of the machine tool MT.

The main control unit 12 may be configured to control the light emission of the first light-emitting portion 28a upon occurrence of an anomaly in the display control unit 22 so as to notify that the main control unit 12 is operating correctly. Thereby, when an anomaly occurs in the display control unit 22, the operator can recognize whether or not the main control unit 12 operates correctly.

The numerical control apparatus 10 may further include a first register 30a for storing a command signal for controlling the light emission of the first light-emitting portion 28a; and a second register 30b for storing a command signal for controlling the light emission of the second light-emitting portion 28b. The first light-emitting portion 28a may be configured to emit light in accordance with the command signal stored in the first register 30a while the second light-emitting portion 28b may be configured to emit light in accordance with the command signal stored in the second register 30b.

The numerical control apparatus 10 may include an input device 20 for receiving an operation by an operator and at least one of the first light-emitting portion 28a and the second light-emitting portion 28b may be provided in the input device 20. Further, at least one of the first light-emitting portion 28a and the second light-emitting portion 28b may be provided in an operation panel OP arranged in the machine tool MT to control the movement of an axis of the machine tool MT. Thus, since the first light-emitting portion 28a and the second light-emitting portion 28b are provided on the input device 20 or the operation panel OP, which is frequently operated by the operator, the light emitting states of the first light-emitting portion 28a and the second light-emitting portion 28b can be promptly recognized.

The first light-emitting portion 28a and the second light-emitting portion 28b may include at least one of a 7-segment display 32 and an LED 34.

The numerical control apparatus 10 may further include a speaker 40 for notifying occurrence of an anomaly in the display control unit 22 by sound when an anomaly occurs in the display control unit 22, making the display control unit 22 unable to display the status of the machine tool MT and the main control unit 12 on the image display device 24. Thereby, the operator can recognize an anomaly of the display control unit 22 by sound and know the anomaly of the display control unit 22 even from a place away from the second light-emitting portion 28b.

Although certain preferred embodiments of the present invention have been shown and described in detail, it should be understood that various changes and modifications may be made therein without departing from the scope of the appended claims.

What is claimed is:

1. A numerical control apparatus for controlling a machine tool, comprising:
   a first control unit configured to control the machine tool for machining;
   an image display device configured to display at least status of the machine tool and the first control unit;
   a second control unit configured to control the image display device;
   a first light-emitting portion; and,
   a second light-emitting portion, wherein
   when an anomaly occurs in the second control unit, making the second control unit unable to display the status of the machine tool and the first control unit on the image display device, the first light-emitting portion notifies the status of the machine tool or the first control unit by emission of light and the second light-emitting portion notifies by emission of light that an anomaly has occurred in the second control unit,
   the first control unit and the second control unit are configured to control, while the numerical control apparatus is being booted up, the first light-emitting portion and the second light-emitting portion, respectively, so as to notify operating status of the first control unit and the second control unit in a stepwise manner that is in association with progress of a startup process.

2. The numerical control apparatus according to claim 1, wherein the second control unit is configured to control the light emission of the second light-emitting portion to notify that there is no anomaly in the second control unit.

3. The numerical control apparatus according to claim 1, wherein the first control unit is configured to control the light emission of the second light-emitting portion upon occurrence of an anomaly in the second control unit so as to notify that an anomaly has occurred in the second control unit.

4. The numerical control apparatus according to claim 1, wherein the second control unit is configured to control the image display device so as to display the status of the machine tool and the first control unit after completion of startup of the numerical control apparatus.

5. The numerical control apparatus according to claim 1, wherein the first control unit is configured to control the light emission of the first light-emitting portion upon occurrence of an anomaly in the second control unit so as to notify the status of the machine tool.

6. The numerical control apparatus according to claim 1, wherein the first control unit is configured to control the light emission of the first light-emitting portion upon occurrence of an anomaly in the second control unit so as to notify that the first control unit is operating correctly.

7. The numerical control apparatus according to claim 1, further comprising:
   a first register configured to store a command signal for controlling the light emission of the first light-emitting portion; and,
   a second register configured to store a command signal for controlling the light emission of the second light-emitting portion, wherein:
   the first light-emitting portion emits light in accordance with the command signal stored in the first register; and
   the second light-emitting portion emits light in accordance with the command signal stored in the second register.

8. The numerical control apparatus according to claim 1, further comprising:
   an input device for receiving an operation by an operator, wherein at least one of the first light-emitting portion and the second light-emitting portion is provided in the input device.

9. The numerical control apparatus according to claim 1, wherein at least one of the first light-emitting portion and the second light-emitting portion is provided in an operation panel arranged in the machine tool to control movement of an axis of the machine tool.

10. The numerical control apparatus according to claim 1, wherein the first light-emitting portion and the second light-emitting portion include at least one of a 7-segment display and a light-emitting diode.

11. The numerical control apparatus according to claim 1, further comprising a speaker configured to notify occurrence of an anomaly in the second control unit by sound when an anomaly occurs in the second control unit, making the second control unit unable to display the status of the machine tool and the first control unit on the image display device.

* * * * *